US010848548B2

(12) United States Patent
Alkove et al.

(10) Patent No.: US 10,848,548 B2
(45) Date of Patent: Nov. 24, 2020

(54) USER STATUS REPORTS PROVIDED BY AN ENTERTAINMENT ACCESS SYSTEM

(71) Applicant: MICROSOFT TECHNOLOGY LICENSING, LLC, Redmond, WA (US)

(72) Inventors: James M. Alkove, Bellevue, WA (US); Chadd B. Knowlton, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 59 days.

(21) Appl. No.: 16/059,515

(22) Filed: Aug. 9, 2018

(65) Prior Publication Data

US 2019/0124137 A1 Apr. 25, 2019

Related U.S. Application Data

(63) Continuation of application No. 15/209,634, filed on Jul. 13, 2016, now Pat. No. 10,075,512, which is a (Continued)

(51) Int. Cl.
*H04L 29/06* (2006.01)
*H04L 29/08* (2006.01)
(Continued)

(52) U.S. Cl.
CPC .............. *H04L 67/10* (2013.01); *G06Q 30/02* (2013.01); *G06Q 30/04* (2013.01); *H04L 67/306* (2013.01)

(58) Field of Classification Search
CPC ....... H04L 67/10; H04L 67/306; G06Q 30/04; G06Q 30/02
See application file for complete search history.

(56) References Cited

U.S. PATENT DOCUMENTS 6,965,948 B1 * 11/2005 Eneborg .............. H04L 12/5692 709/227
7,697,040 B2 * 4/2010 Sorensen ................ G06F 16/58 348/231.2

(Continued)

OTHER PUBLICATIONS

Mulerikkal et al., "An Architecture for Distributed Content Delivery Network", Retrieved From http://citeseerx.ist.psu.edu/viewdoc/download?doi=10.1.1.127.5309&rep=rep1&type=pdf, Published Jul. 17, 2007 (Year: 2007).*

*Primary Examiner* — Chau Le
(74) *Attorney, Agent, or Firm* — Alleman Hall Creasman & Tuttle LLP

(57) ABSTRACT

An entertainment access system is provided that enables a user to request and receive status reports that present current information concerning a wide variety of items pertaining to the user's devices, entertainment content and usage rights in a standard, predictable and consistent manner that enhances rather than hinders the user experience. In some illustrative examples, the user can request the status report from one of his devices that is registered with the entertainment access system. The entertainment access system responds by collecting and formatting the status information so that is can be conveniently displayed or otherwise rendered on the registered device. For instance, if the request is received from a cell phone device, which generally has a relatively small screen, the information may be presented in a relatively abbreviated format. On the other hand, if the request is received from the user's personal computer, the information may be presented by the entertainment access system to the personal computer in a more detailed or entirely different format than when the information is to be presented to a cell phone device.

15 Claims, 10 Drawing Sheets

Related U.S. Application Data continuation of application No. 14/059,390, filed on Oct. 21, 2013, now abandoned, which is a continuation of application No. 12/165,632, filed on Jun. 30, 2008, now Pat. No. 8,621,094.

(51) Int. Cl.
*G06Q 30/02* (2012.01)
*G06Q 30/04* (2012.01)

(56) References Cited

U.S. PATENT DOCUMENTS

| | | | |
|---|---|---|---|
| 2003/0220734 A1* | 11/2003 | Harrison | G06Q 10/10 701/409 |
| 2005/0166245 A1* | 7/2005 | Shin | H04N 7/17318 725/104 |
| 2008/0172315 A1* | 7/2008 | Farouki | G06Q 30/02 705/35 |
| 2010/0185673 A1* | 7/2010 | Toebes | H04N 21/23439 707/780 |
| 2011/0302275 A1* | 12/2011 | Prodan | G06Q 20/10 709/218 |
| 2012/0324052 A1* | 12/2012 | Paleja | G06F 8/60 709/217 |
| 2013/0005356 A1* | 1/2013 | Kobayashi | H04W 64/003 455/456.1 |
| 2015/0373634 A1* | 12/2015 | Periyalwar | H04W 48/18 370/328 |
| 2017/0195706 A1* | 7/2017 | Arora | H04N 21/466 |

* cited by examiner

USER STATUS REPORTS PROVIDED BY AN ENTERTAINMENT ACCESS SYSTEM

CROSS REFERENCE TO RELATED APPLICATIONS

This application is a continuation of, and claims priority to previously filed U.S. patent application Ser. No. 15/209,634 filed on Jul. 13, 2016 entitled "USER STATUS REPORTS PROVIDED BY AN ENTERTAINMENT ACCESS SYSTEM", which is a continuation of, and claims priority to U.S. patent application Ser. No. 14/059,390 filed Oct. 21, 2013 entitled "USER STATUS REPORTS PROVIDED BY AN ENTERTAINMENT ACCESS SYSTEM", which is a continuation of, and claims priority to U.S. patent application Ser. No. 12/165,632 filed Jun. 30, 2008 entitled "USER STATUS REPORTS PROVIDED BY AN ENTERTAINMENT ACCESS SYSTEM", the subject matters of which are hereby incorporated by reference in their entireties.

BACKGROUND

Users enjoy entertainment content in many different ways. Users can enjoy content in ways dictated by a traditional content distributor such as a radio station or movie theater, for example, by listening to songs on the radio or watching movies in the theater. When users listen to the radio they don't pay a fee but they often have to listen to advertisements. When users watch a movie in a theater, they usually pay a one-time fee. If they want to see the movie again, they pay again.

Users also enjoy content using physical media usually purchased from another type of content distributor, such as through purchasing songs on CD or movies on DVD. Users often buy content on physical media so that they can enjoy it when they want and as often as they want. Users have grown accustomed to this type of content distribution. They know—so long as their CD or DVD is not damaged—that they can enjoy the song or movie whenever they want and as often as they want. A teenager can listen to "Groove is in the Heart" 1,000 times if she wants. A movie buff can watch "Braveheart" or "Highlander" every night. Further, users have grown accustomed to the implicit benefits of buying content on a CD or DVD; they can lend "Braveheart" to a friend to watch or "Groove is in the Heart" to a classmate to play at a dance party. They can also enjoy the song or movie on whatever device they have that can play it; they can put their CD in their old, home CD player or their new mobile one simply by moving the CD from one player to the other.

More recently, users have been able to access entertainment content digitally, such as through subscription and pay-per-view services. These services have benefits but also disadvantages over buying content on physical media. The advantages include more-flexible ways to pay and use content, such as accessing content for a period of time, e.g., by subscribing to a service that allows them to play a particular song on their MP3 player for 30 days. Another flexible way is to pay to save or download content a certain number of times, e.g., "buying" a song to have a right to download it to a computer and then record/transfer it to other devices or storage as many as seven times. Still another way is similar to watching a movie in a theater in that a user pays once to enjoy the content once; e.g., to play a movie on his own TV once.

Some of these digital distribution services, however, do not permit users to enjoy entertainment content in the ways in which they have grown accustomed. Someone who, in the past, could buy a song on CD and play it on any CD player that she, a family member, or a friend owns, often cannot do so using these services. Also, many users do not trust the reliability and longevity of "owning" content through a service. If a person buys the right to a song, and thus can transfer or save it some number of times, the person may effectively lose that right if their computer storage fails or is stolen. A music fan could buy rights to thousands of songs and lose the right to use all of them if his computer hard drive fails. These are just some of the limitations present in many current digital content distribution services.

These digital distribution services, as well as traditional distribution services, are often blind in how they use advertising to support access to entertainment content. Traditional distribution systems, such as broadcast television, provide programs with the same advertisement to large groups of consumers even if those consumers are very different. Television, for example, often advertises children's products to people without children, engagement rings to married people, and retirement accounts to children. This type of advertising is not well-targeted.

Recently, entertainment access systems have been developed that are capable of managing digital content based on a user's identity, one example of which is shown in U.S. application Ser. No. 11/771,923 entitled "Entertainment Access Service." These systems offer services that free people from the limitations of their storage media and devices. For instance, if a user's CD breaks or hard drive fails, the systems permit a user to continuing accessing his content. If a user wants to use a new device or even many new devices, even if those devices play content with a different format than a user's existing devices, the system may permit him to play his content on those new devices. If a user wants to share content with a friend, the system may permit it even if the user does not have the content on hand.

SUMMARY

While entertainment access systems can unify and simplify a user's enjoyment of content by managing the user's devices, entertainment content and usage rights, it can quickly become difficult and even bewildering for the use to keep track of all his available options (e.g., which content is available on which devices, which particular content items can be shared with friends, and so on). Accordingly, an entertainment access system is provided that enables a user to request and receive status reports that present current information concerning a wide variety of items pertaining to the user's devices, entertainment content and usage rights in a standard, predictable and consistent manner that enhances rather than hinders the user experience.

In some illustrative examples, the user can request the status report from one of his devices that is registered with the entertainment access system. The entertainment access system responds by collecting and formatting the status information so that is can be conveniently displayed or otherwise rendered on the registered device. For instance, if the request is received from a cell phone device, which generally has a relatively small screen, the information may be presented in a relatively abbreviated format. On the other hand, if the request is received from the user's personal computer, the information may be presented by the entertainment access system to the personal computer in a more detailed or entirely different format than when the information is to be presented to a cell phone device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 3 illustrates an example flow diagram showing the entertainment access service providing third-party content providers with selectable options by which they may decide on how their content will be used and/or paid for.

DETAILED DESCRIPTION

Overview

The following document describes tools capable of managing digital content based on a user's identity. This management may include ways in which to permit users to gain access to content with devices associated with them or even devices associated with others, like the user's friends or classmates. The tools may also build and alter profiles associated with users to better interact with users, including by learning which advertisements are likely to be well received by users or at least by certain types of users. The tools may perform these and other actions through a direct relationship with users or through an indirect one, such as when third-party content providers use the tools but provide their own direct interface with users.

An environment in which the tools may enable these and other actions is set forth below in a section entitled Example Operating Environment. This is followed by another section describing example relationships and specifications devices may follow to interact with the tools; it is entitled Device Relationships. The next section describes some example ways in which third-party content providers may interact with the tools, entitled Third-Party Content Providers. This section is followed by a section entitled An Example Profile, which describes an example profile for a user. The next section, entitled Example Request describes one way in which an entertainment access service may receive and respond to a request for access to entertainment content and to status reports. Lastly, a section entitled Other Embodiments of the Tools describes and illustrates three processes in which the tools provide other example embodiments of the tools, including ways in which the entertainment access service may respond to requests for access, alter profiles for users, and determine the effectiveness of particular advertisements, to name a few. This overview, including these section titles and summaries, is provided for the reader's convenience and is not intended to limit the scope of the claims or the entitled sections.

Example Operating Environment

Before describing the tools in detail, the following discussion of an example operating environment is provided to assist the reader in understanding some ways in which various inventive aspects of the tools may be employed. The environment described below constitutes one example and is not intended to limit application of the tools to this or any particular operating environment. Other environments may be used without departing from the spirit and scope of the claimed subject matter.

Figure 1:
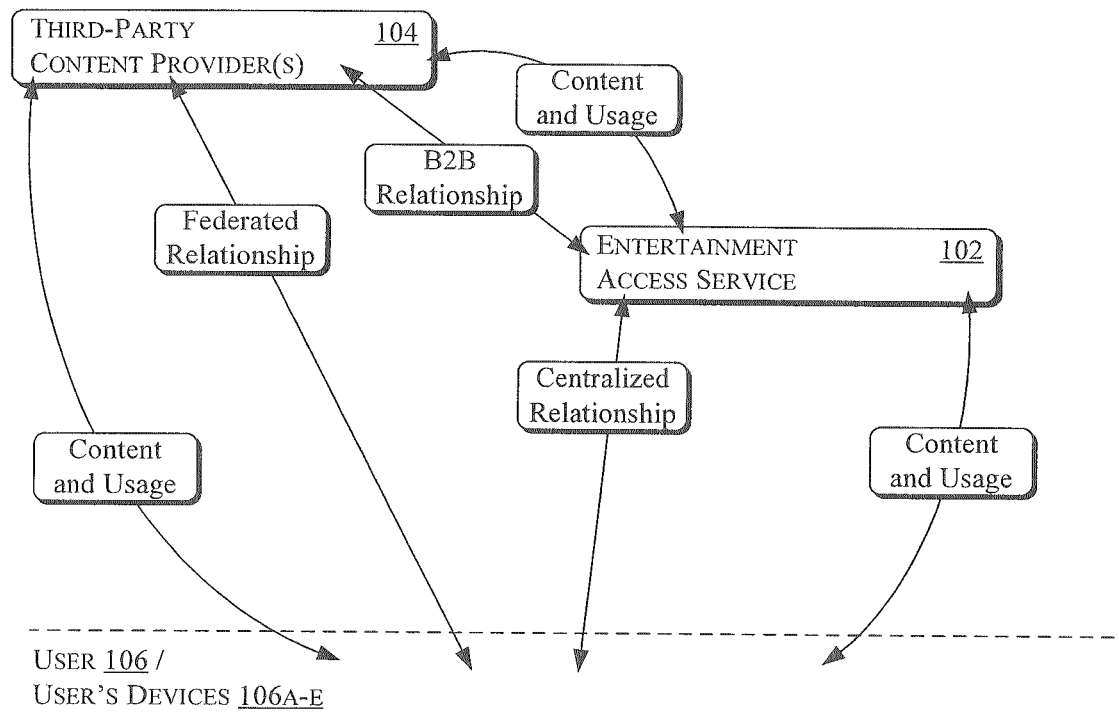
FIG. 1 illustrates an example operating environment having an entertainment access service, third-party content providers, a user, and devices associated with the user; this example operating environment is one in which various embodiments of the tools may operate.
Figure 1:
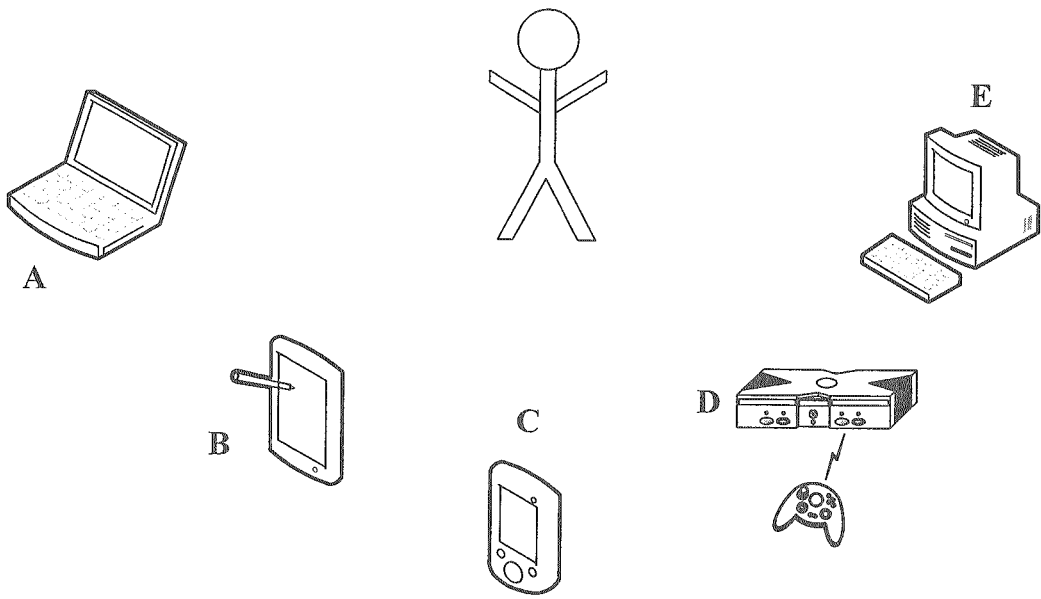

FIG. 1 illustrates one such operating environment generally at 100 having an entertainment access service 102, third-party content providers 104, a user 106, and devices 106A-106E associated with the user.

This particular environment illustrates very generally two manners in which the entertainment access service may operate; a centralized manner and a federated manner. In the centralized manner the entertainment access service has a direct relationship with a user—the user interacts with the entertainment access service directly, such as through the entertainment access service's website in which they select content, preferences, associate devices, or make payments. In this manner content is received by the entertainment access service from the third-party content providers based on business-to-business relationships with those providers (shown with an arrow entitled "B2B Relationship") and then usually provided by the entertainment access service directly to the users.

In the federated manner, the entertainment access service manages content for users but often behind the scenes. The user's direct interactions are instead usually with the third-party content providers. Users may select content, preferences, associate devices, or make payments directly with the third-party content providers. The third-party content providers interact in a business-to-business relationship with the entertainment access service (again shown with the arrow entitled "B2B Relationship"), such as to provide information about the user, the content needed or already provided, and the like. Here the entertainment access service may provide content directly to the user and receive usage information directly back or the third-party content provider may do so and then indicate this usage and provided content to the entertainment access service.

In either manner, the entertainment access service acts to manage digital content based on a user's identity. The entertainment access service may do so in part by storing content and rights associated with that content (e.g., licenses) and/or by managing such content and rights stored remotely (e.g., with content stored at a remote entity or even at the third-party content provider that provided the content).

The entertainment access service, for example, may manage a user's usage rights to entertainment content and thus how the user is permitted to use the entertainment content, whether operating in a federated or centralized manner. Based on a user's identity, for example, the entertainment access service may determine that a user may download a song to a particular device, in what file format, in what resolution format, for how long the song may be played by that particular device, at what cost, and track when and how often the user plays the song on that device. The entertainment access service does so in part through relationships with the user's devices. These relationships will be described in detail and illustrated in FIG. 2.

The user does not have to be a single person. User 106 may include a group of persons. The persons may be grouped by all of them having access to one or more of devices 106A-E. The persons also may be grouped by living in a same household (e.g., a user representing a group including Dad, Mom, and the kids). If the user is a group of persons, the identity associated with the user may be the identity of each member of the group or a common identity for all members of the group (e.g., an access code and account number).

The content may be any type of digitally-distributable content, such as entertainment content. This content may include, by way of example, songs, music videos, movies, television shows, still images, and gaming software.

Device Relationships

Figure 2:
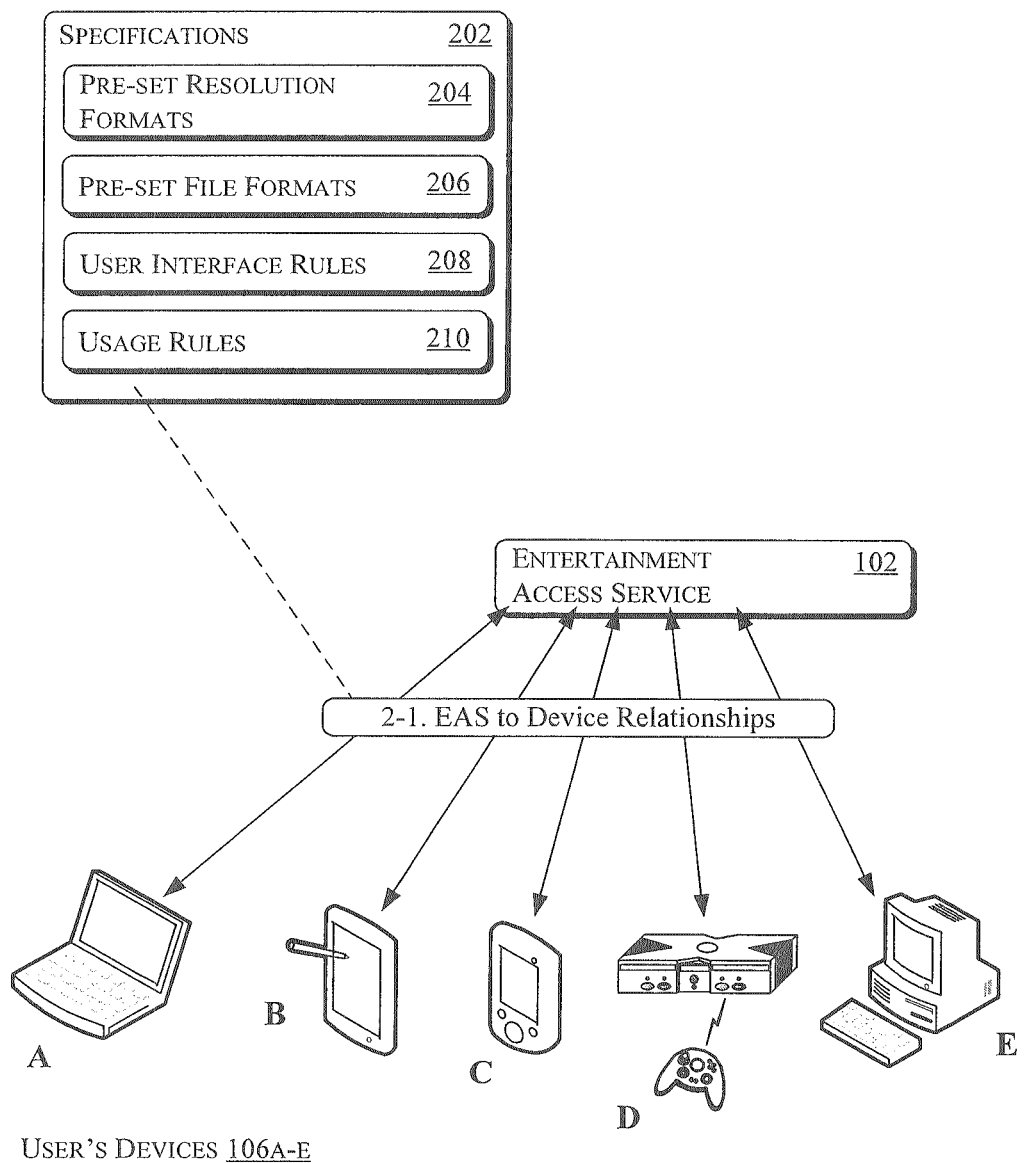
FIG. 2 illustrates example relationships between an entertainment access service and various devices (and their manufacturers), as well as example pre-set specifications that the devices follow to interact with the entertainment access service.

FIG. 2 illustrates example relationships between the entertainment access service and various devices (and their manufacturers). FIG. 2 also shows example pre-set specifications that the devices follow to interact with the entertainment access service.

Arrows 2-1 represent relationships between the entertainment access service and the devices and/or their manufacturers. The devices follow specifications 202 in order to interact with the entertainment access service. In this example the specifications include pre-set resolution formats 204, pre-set file formats 206, user interface rules 208, and usage rules 210. The pre-set resolution formats may include, by way of example, a low resolution format, a medium resolution format, and a high resolution format.

Also by way of example only, the low resolution format may be a maximum resolution capable of being rendered by a cellular phone having less than a two-inch-by-two-inch display, the medium resolution format may be a maximum resolution capable of being rendered by a non-high definition, four-by-three aspect ratio display having less than a fifty-two-inch hypotenuse-measured screen, and the high resolution format may be a maximum resolution capable of being rendered by a device capable of rendering at full resolution a high definition digital video disk (HD DVD™) or Blu-Ray™ DVD, to name just a few resolution format possibilities.

The file formats may include, also by way of example only, JPEG, WAV, WMP, MP3, WMV, M4V, DVD, HD DVD™, and Blu-Ray™ DVD.

Each relationship also includes various specifications on how a device should act and interact, such as generating a particular user interface or menu structure (e.g., consistent with all other devices that work with the entertainment access service) when rendering content provided by the entertainment access service. These are shown as user interface rules 208. The user interface rules may require that each device be capable of interacting with users having a same look and feel to its interface, such as have a same menu with same graphical icons incident with rendering content.

These specifications may also include usage rules 210, which may govern how a device is to render entertainment content, when, how often, when to cease doing so, track usage information, track advertisements accompanying or otherwise provided by the entertainment access service (or a third party with a relationship with the entertainment access service), how to render and a requirement to render advertisements in a certain way, and the like. Thus, the entertainment access service may require that devices provide a consistent user interface for entertainment access service content, track usage, track and render advertisements, and communicate this information to the entertainment access service.

The entertainment access service may also require that each particular device (rather than all devices of a particular type from a particular manufacturer) have a unique identifier. This identifier may later be used by the entertainment access service to associate the device with a user or identify the user.

Through the relationship with the manufacturer of cell phone device 106C, for example, the entertainment access service may require-and the manufacturer may cause the device to be capable of-using the pre-set low resolution format described above, providing a user interface consistent with other user interfaces for entertainment access service content, rendering advertisements, tracking usage (including advertisement usage), only rendering content when permitted to do so by the entertainment access service, and providing usage information back to the entertainment access service.

Third-Party Content Providers

Figure 3:
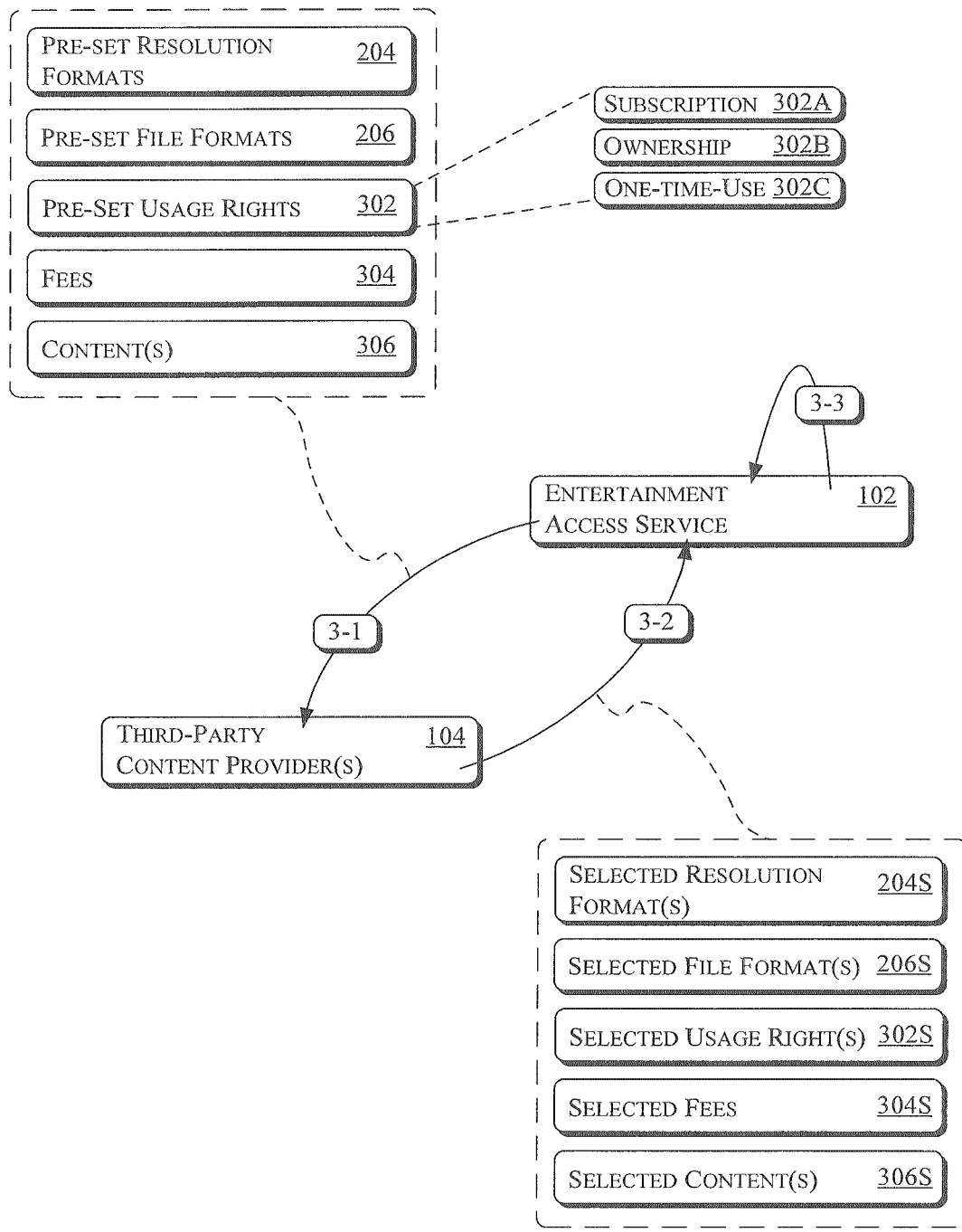

FIG. 3 illustrates an example flow diagram showing the entertainment access service providing third-party content providers with selectable options by which they may decide on how their content will be used and/or paid for. As will become apparent, the entertainment access service enables third-party content providers, whether the entertainment access service is operating in a centralized or federated manner, to choose various business and content options.

At arrow 3-1, entertainment access service 102 enables multiple third-party content providers to select from the pre-set resolution formats 204 (first shown in FIG. 2), the pre-set file formats 206 (also from FIG. 2), pre-set usage rights 302, fees 304, and indicate content(s) 306 that will be made available and that will be subject to the selected formats, rights, and fees.

Examples of pre-set resolution and file formats are described in FIG. 2. In this FIG. 3, three example pre-set usage rights are selectable, a subscription-based usage right 302A, an ownership-based usage right 302B, and a one-time-use usage right 302C. The fees for each may vary or depend on whether an advertisement is included. In a federated manner of operation the fees may not be relevant if all billing and fees are managed by the third-party content providers. In a centralized manner the fees may be chosen by the entertainment access service or the entertainment access service and the third-party content providers together as part of their business relationship.

At arrow 3-2, each third-party content provider provides selected content 306S (or indicia thereof) that will be managed by the entertainment access service based on selected formats 204S and 206S, selected usage rights 302S, and selected fees 304S for that selected content. If the third-party content provider selects more than one resolution format or file format for the content, the entertainment access service may later decide between which of these to use for content based on the device itself or preference of the user.

At arrow 3-3, the entertainment access service associates selected content with the selected formats, usage rights, and/or fees. For example, a third-party content provider may provide music-video entertainment content and select for that content: a low resolution format; three file formats that the third-party content provider will provide the content in and with which devices may render the music videos; and the subscription usage right with two different fees, one with advertisement and one without.

Thus, at this point the entertainment access service has an indication of which content is at issue (for example any music video in the third-party content provider's library), the low resolution format, the three file formats available, and a subscription service fee of $4.95 per month for up to 100 music videos without advertisement and $0.95 for access and use of up to 100 music videos per month with advertisement.

With this set out a user may then download a music video of "Groove is in the Heart" to her cell phone and her PDA and, if she selected advertisements, watch the video as much as she likes on her cell phone and PDA for a month as part of her $0.95-a-month subscription fee, though she may have to watch a short advertisement before the video plays. After the month is up, the devices may both stop playing the video unless the entertainment access service indicates that she has re-subscribed. How a user may use the entertainment access service is described in more detail below. This simplistic example is just to give the reader an idea of some of the entertainment access service's capabilities.

Any of the above may be performed for many different third-party content providers and for various different contents for each of the different third-party content providers. Thus, one third-party content provider may select different formats, rights, and fees for some content than other content.

As noted above, the entertainment access service manages content based on a user's identity. In the below example embodiment illustrated in FIG. 4, the entertainment access service uses a profile associated with a user to manage content for that user.

An Example Profile

Figure 4:
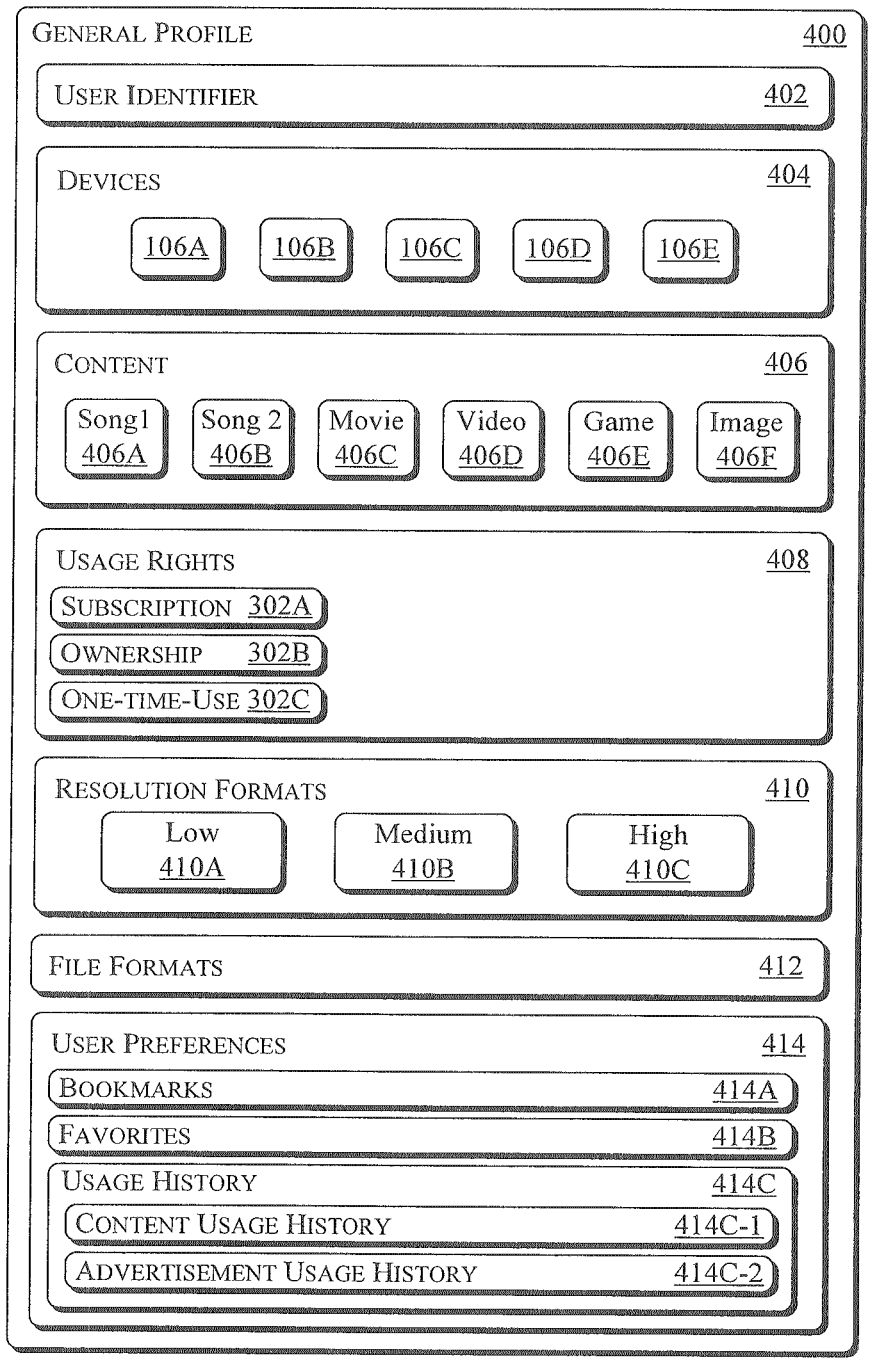
FIG. 4 illustrates an example profile for a user.

FIG. 4 illustrates an example of a profile at 400. Other examples of profiles and ways in which profiles may be built, altered, and used by the entertainment access service, users, and third-party content providers are discussed below as well. This particular profile 400 is simply one example of many different profiles and profile structures usable by the entertainment access service to manage content.

This profile includes a user identifier 402, information about various devices 404, content 406, usage rights 408 associated with that content, resolution and file formats 410 and 412 for each content, as well as user preferences 414. The devices include five different devices, here 106A-E shown in FIG. 1. The content includes six different entertainment content, two songs 406A and 406B, a movie 406C, a music video 406D, a computer game 406E, and a still image 406F. The usage rights include three usage rights, here subscription 302A, ownership 302B, and one-time-use 302C illustrated in FIG. 3, each associated with one or more of the content. The resolution and file formats include three resolutions (low 410A, medium 410B, and high 410C) associated with content and various file formats not shown for simplicity. The user preferences include bookmarks 414A, favorites 414B, and usage history 414C. Bookmarks and favorites are explicitly selected by the user. The usage history is built based on the user's actions (e.g., what content was rendered and when, etc.) and other information about the user.

The usage history may include a record of which contents the user has viewed, when, and how often (a content usage history 414C-1). It may also include a record of advertisements viewed, when, how often, and actions performed by the user in response to the advertisements (an advertisement usage history 414C-2).

The profile may contain a wealth of information, such as information sufficient information to determine that a request for content received from some entity or device is actually from a particular user (e.g., the user associated with the profile). This may be enabled by the entertainment access service having a unique identifier associated with a device and a request coming from that device with that unique identifier included with the request. The profile may also include the user identifier 402, which may be independent of the devices, such as an account number and password.

The associations between content and usage rights are not explicitly shown in the profile for simplicity, but the profile may indicate, for example, that movie 406C can be rendered by device 106A with a medium resolution format, device 106C with a low resolution format, and 106E with a high resolution format. It may also indicate that the movie has one-time-use usage rights 302C permitting the user to download it to device 106A in low resolution for $1.00, device 106C in medium resolution for $2.50, or to device 106E in high resolution for $4.00. The devices can be constrained by the entertainment access service to then only permit anyone of these devices to play the movie once.

The profile may also indicate a user preference (e.g., with a bookmark), to download the movie to a device (e.g., 106E) capable of playing the movie at high resolution but instead download it at medium resolution-perhaps because the user wants to transfer the movie to a friend's medium-resolution laptop for playing at his house later.

Thus, the profile may contain information for the entertainment access service to determine that a request for access to content is from the user associated with the profile, that the access requested is permitted or not, the device intended to render the content (e.g., device 106E or instead the user's friends laptop) and its being uniquely associated with the user, the file format or resolution format appropriate for that device, and so forth. These and other capabilities will be addressed in greater detail as part of examples provided below.

Example Request

Figure 5:
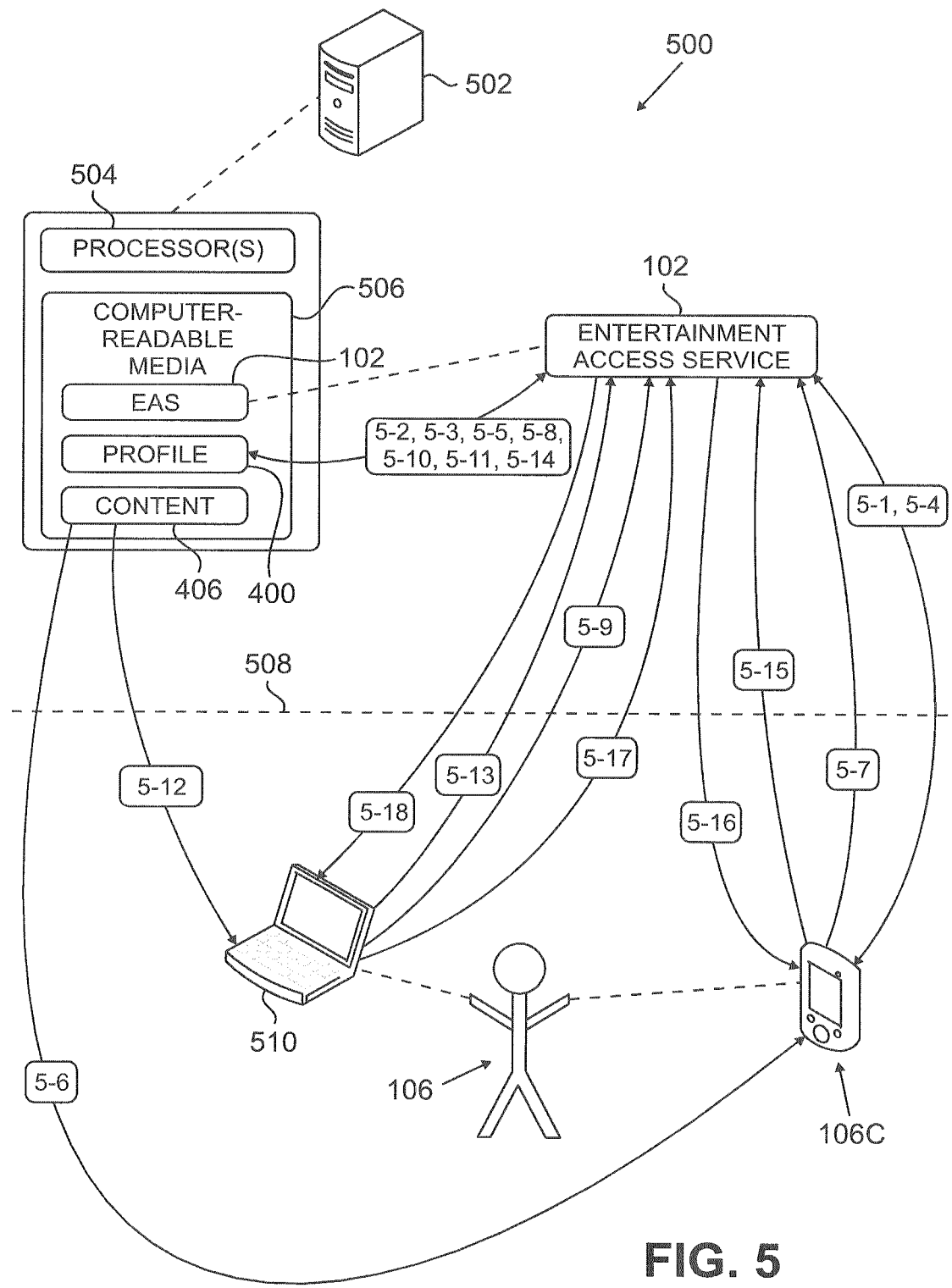
FIG. 5 illustrates an example flow diagram showing the entertainment access service interacting with a user.

FIG. 5 illustrates a flow diagram 500 showing the entertainment access service interacting with a user. This particular example illustrates ways in which the tools may act to manage a user's entertainment content. This example is an implementation of the tools but is not intended to limit the scope of the tools or the claimed embodiments.

The arrows described herein illustrate actions, interactions, and results of these actions and interactions between the elements shown in FIG. 5.

For this example the entertainment access service is a computer program residing on a computing device 502 having one or more processor(s) 504 and tangible computer-readable media 506. The computing device is shown with a server icon, though it may comprise one or multiple computing devices of various types. The processors are capable of accessing and/or executing the computer-readable media. The computer-readable media comprises or has access to entertainment access service 102 and profile 400 and content 406 (both of FIG. 4).

At arrow 5-1 the entertainment access service enables the user to request access (in conjunction with device 106C) to entertainment content and user 106 makes such a request. This request here includes information sufficient to determine the user's identity, such as an identifier uniquely identifying the user (e.g., an account number and password) or by the request being made from device 106C having a unique identifier stored in profile 400 and associated with the user.

The request is made across a communications network 508, here represented by a dashed line. The communications network may include a company intranet and/or a global network (e.g., the Internet) and may be wireless, wired, or a combination of these.

The request for access may be a request to render content already stored on a device, such as by the device asking the entertainment access service whether or not the user's monthly subscription has been paid and thus that rendering the content is permitted (e.g., if the user's request is received during a subscription period that is in force). The request for access may also request that content be downloaded for contemporaneous or later rendering.

By way of example, here we will assume that the user, through device 106C interacting with the entertainment access service, is requesting ownership rights to and downloading of a music video ("Groove is in the Heart") intended to be rendered (played) on this device. We will also assume that the user has already been a customer of the entertainment access service and thus has an associated profile.

At arrow 5-2 the entertainment access service determines that the request is from the user. Here the entertainment access service does so by finding the identifier for device 106C (which is unique to the device) in the request, determining that the device's identifier is recorded in the user's profile, and thus that the request is being made by the user.

At arrow 5-3 the entertainment access service determines whether or not the user has a right to the request—here to download this music video. The entertainment access service may do so based on usage rights associated with the user and the user's content (e.g., rights 302A to 302C in profile 400). In this example the entertainment access service determines that while the user has many rights to various contents, none of the user's usage rights are associated with this particular content. Thus, the user has not purchased an ownership right to this music video.

At arrow 5-4 the entertainment access service and the user interact sufficient for the user to gain the requested access, here by the user paying for and gaining an ownership right in the music video but at a reduced cost by the user selecting ownership rights but with an advertisement to be played before each rendering of the music video. Responsive to this, the entertainment access service updates profile 400 at arrow 5-5 to indicate that the user has an ownership right in the music video of "Groove is in the Heart."

At arrow 5-6, the entertainment access service permits the access, which here includes downloading the music video to device 106C with an advertisement in resolution and file formats indicated as appropriate for that device in the profile.

The user is now able to play the music video on device 106C. Responsive to the user playing the music video, the device 106C uploads at some future or incident time usage information to the entertainment access service. Here we assume that the usage information indicates that the user played the music video at a particular time, played it just after playing another dance music video and the name of that video, that after playing the music video the user selected to play another music video from the same artist, that the user did not perform any actions in response to the advertisement rendered with the video, or that the user commanded the device to cease rendering the advertisement (e.g., because the user hates watching it).

The entertainment access service receives this usage information at arrow 5-7. Responsive to receiving this information, the entertainment access service updates profile 400 at arrow 5-8. Based on this and other updates to the profile the entertainment access service may learn about the user's likes and dislikes, reaction to particular advertisements, and the like.

At arrow 5-9 the user makes another request, here again to download "Groove is in the Heart". Here, however, the request is received from a device not associated with the user (not devices 106A-E). If it were received by a device that is associated with the user the entertainment access service would, if the number of downloads permitted by the ownership right had not been met, permit download of the music video. Here, however, the user is attempting to download the music video to a friend's laptop 510 that is not associated with the user.

In this case the entertainment access service attempts to determine from whom the request is being made. Here the entertainment access service provides a user interface for the user to enter an account and password uniquely associated with the user (all part of arrow 5-9). Responsive to receiving this information the entertainment access service determines that the request is from the user associated with profile 400 at arrow 5-10.

At arrow 5-11 the entertainment access service determines, based on the profile, that the user has a right to download the music video, and so downloads the video with advertisement (at arrow 5-12) to the user's friend's laptop 510.

Responsive to this second request by the user and the information garnered during the process (some received in an upload of usage information at arrow 5-13), the entertainment access service updates the user's profile at arrow 5-14 to indicate that the friend's laptop (already known to be owned by the friend, such as by the friend having a profile), is not the user's device but that the user is associated with the friend. Also, the entertainment access service updates the profile to indicate that the user has one less download permitted by the user's ownership right in the video.

As may be apparent even with this relatively simple example, the entertainment access service may provide access to entertainment content to a user based on the user's identity to the user's devices or even to a friend's device. Further, the entertainment access service may continually update the user's profile based on usage information and even that the user is associated with another person and thus that other person's usage history and preferences. This wealth of information may enable the entertainment access service to better understand what advertisements are appropriate for the user, such as by the user and the user's friend loving dance music and being of a certain age (and other demographic information). Based on this information (e.g., a demographic profile) the entertainment access service may require the user's devices to play the music video with an advertisement directed to young women (e.g., an advertisement for "Young Miss" magazine or a cosmetic). The entertainment access service would then likely forgo advertisements for SUVs or investment companies.

Flow diagram 500 illustrates how a user interacts with the entertainment access system to request and receive content. In addition, however, it is important that the user be able to receive status information concerning the status of their accounts, content and active devices at any given time. This is particularly important given the myriad of different devices and different types of content that the user may be using in connection with the entertainment access system. For instance, the user may be able to access song 406B on devices 106A and 106C, movie 406C on devices 106C and 106E, and game 406E only on 106B. Keeping track of all these different permutations can quickly become difficult or impossible unless the user is presented with this information in a standard, predictable and consistent manner that enhances rather than hinders the user experience.

Accordingly, as indicated by arrow 5-15 in FIG. 5, at any point during the process the user may request a status update report. The request may be made from any of the device 106A-106E. The status report may be generated locally by the device itself using state information available to it. Alternatively, the status report may be generated all or in part by the entertainment access system 105 and delivered to the device. In the particular example presented in FIG. 5, the status report is largely prepared by the entertainment access system 105 and delivered to the device. As indicated by arrow 5-15, the request is received by the entertainment access system 105 from device 106C. In response, the entertainment access system 105 downloads user status information to the user, as indicated by arrow 5-16. Importantly, the status information will be provided to the user in a manner that is consistent with the device from which the user made the request. For instance, if the request is received from cell phone device 106C, which generally has a relatively small screen, the information may be presented in a more abbreviated or entirely different form than if the request were received from the user's personal computer 106E. Similarly, the information will also be presented in a manner that is consistent with the various types of input devices (e.g., touch, keyboard, stylus) that may be available to the individual devices. For example, when a mouse, touch pad or stylus is available as an input device, the status report may include selectable graphical icons that allows the user to access different pages of the report. However, to the extent possible, the status information will be presented in a consistent manner on any given class of device, e.g., cell phone devices, laptops, personal computers, and so on. In this way, as the user becomes familiar with the entertainment access system 105, the user will be able to anticipate the type and format of the information he will receive in the status report. That is, the user will know to anticipate that the information will be received in one particular format on a cellular phone device, another particular format on a laptop, and so on. A similar status update request is shown in FIG. 5 by arrow 5-17 as being received from laptop 510. The response to the request, which is sent by the entertainment access system 105 to the user's laptop 510, is indicted by arrow 5-18.

Figure 9:
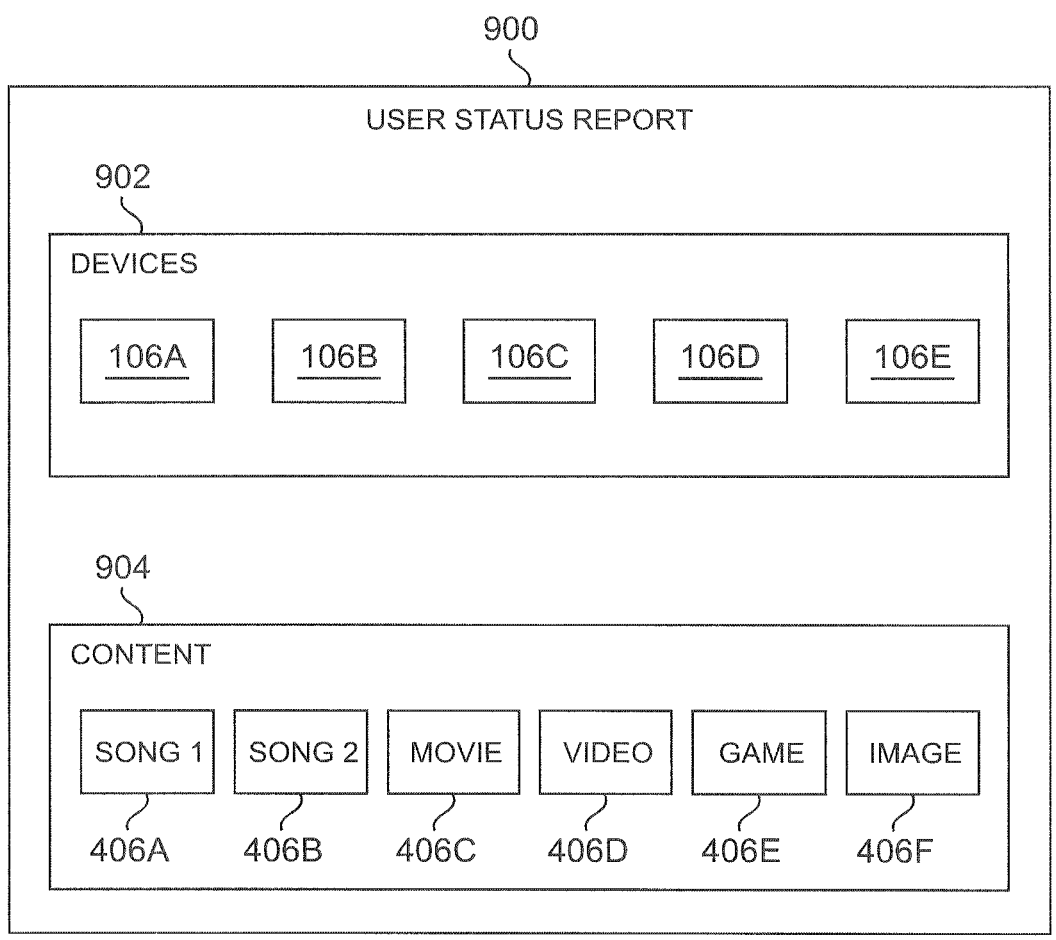
FIG. 9 illustrates an example status report that may be sent to a user.

In this example the entertainment access system 105 prepares the status report using information it obtains from the profile 400 and content 406 available to it from computer readable media 506. As previously mentioned, however, in some implementations the status report may be entirely generated locally by the device itself. One example of a status report 900 that may be presented to the user is depicted in FIG. 9. This particular status report is simply one example of many different reports that may be presented by the entertainment access system 105 to the user. The format in which the information is presented will generally be specified by the entertainment access system 105, and, as previously noted, to the extent possible, will typically be consistent within a particular type or class of devices.

The status report 900 includes a list of devices 902 that the user has registered with the entertainment access system 105 and a list of content 904 to which the user currently has access. In this example the individual items representing the devices and the content are graphical icons that can be selected by the user using an appropriate input device to obtain more information. For instance, if the user selects device 106C, he may be presented with a second page of the report that delineates information concerning the device 106C. One example of such a page is shown in FIG. 10.

Figure 10:
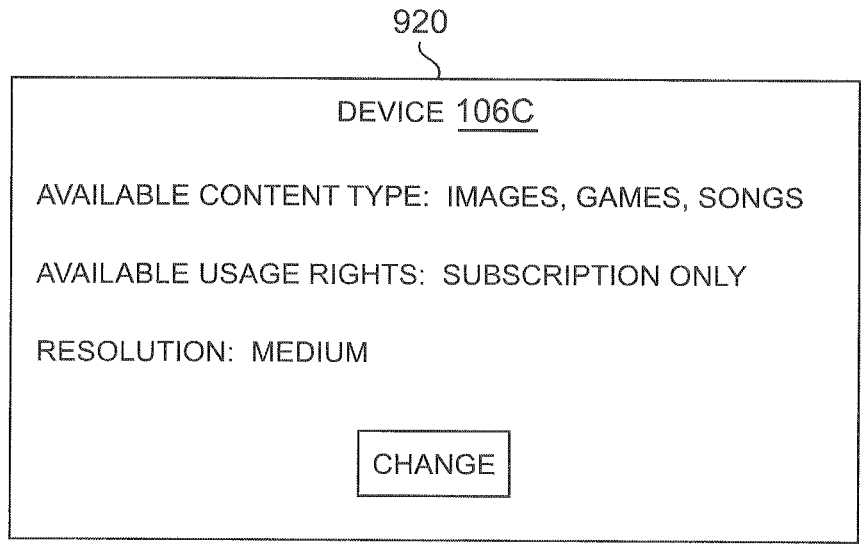
FIG. 10 illustrates one example of an additional page of the status report shown in FIG. 9.

The individual page 920 for device 106C shown in FIG. 10 may present any pertinent information concerning the current status of device 106C. For instance, in this example, the page shows the type of content that the user is currently authorized to access on this device (e.g., images, games and songs only), the usage rights available to the user on this device (subscription only), and the default resolution at which the information will be presented (e.g., medium). Depending on the particular device, additional, fewer or different items of information may be presented to the user. For instance, the page 920 may include additional details concerning the usage rights, such as when they expire, how many different copies may be made, how many different devices the content can be accessed on, and so on. Additionally, as shown, in some cases a graphical icon may be available to the user on the device page, which allows the user to make changes to his current registration such as by changing the available usage rights or available content types or registering or unregistering devices, for example. Such changes will also be reflected in the user's profile 400.

Figure 11:
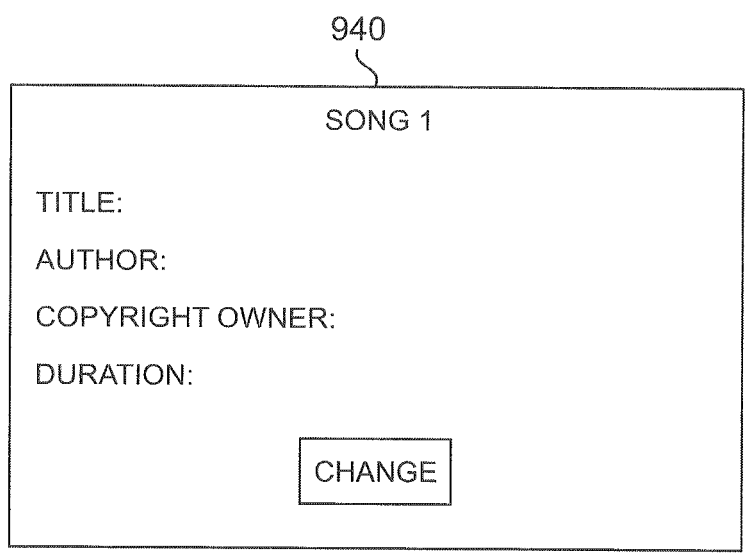
FIG. 11 illustrates another example of an additional page of the status report shown in FIG. 9.

Returning to the status report 900 in FIG. 9, if the user selects one of the currently available content items, say song 106A, he may be presented with another page 940 of the report that provides metadata concerning that content item, an example of which is shown in FIG. 11. In this example content page 940 shows the title, author, copyright owner and duration of the song 106A, all of which may be available as metadata that is stored along with the content. In addition to metadata, however, the page 940 may also include other pertinent information such as the user's available rights to the song. Further, as shown, in some cases a graphical icon may be available to the user on the content page 940, which allows the user to make changes to his user rights concerning the particular content item being displayed. Once again, such changes will also be reflected in the user's profile 400.

While the example of the status report 900 shown in FIG. 9 employs hyperlinks to allow the user to access additional information, other examples may present the information on a single screen, particularly when the report is to be presented on limited capability devices. Alternatively, some information may be eliminated for purposes of brevity or because the user only requests certain information.

In the example presented above the status information is communicated to the user in response to an explicit request from the user. In other cases, however, the status information may be generated either by the entertainment access system or the device itself without an explicit request. For instance, the status report may be sent to the user on some periodic basis (e.g., monthly) or whenever the status of the user changes. The user's status may change because of an action on the user's part, such as when a device is registered or unregistered, available content is added or deleted, or when usage rights are changed. The user's status may also change without any action on the user's part, such as when a subscription or other usage right expires, for example.

Other Embodiments of the Tools

The above sections provide examples of interactions between the entertainment access service, third-party content providers, devices, and users. In this section, other embodiments of the tools are described, some of which are more general than those previously described.

Figure 6:
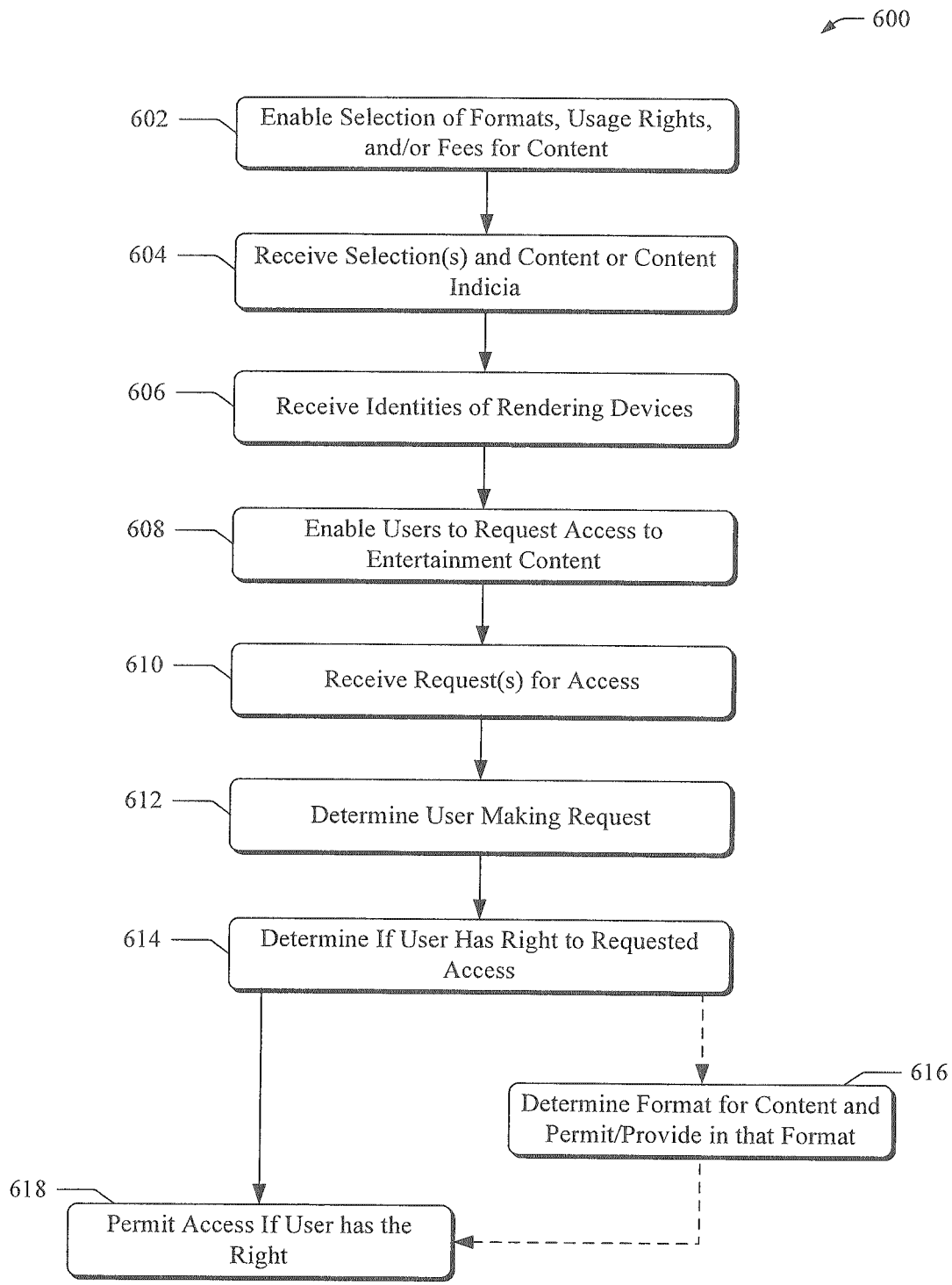
FIG. 6 is an example process illustrating some ways in which the tools may act and interact with devices, third-party content providers, and users effective to manage users' access to entertainment content.
Figure 7:
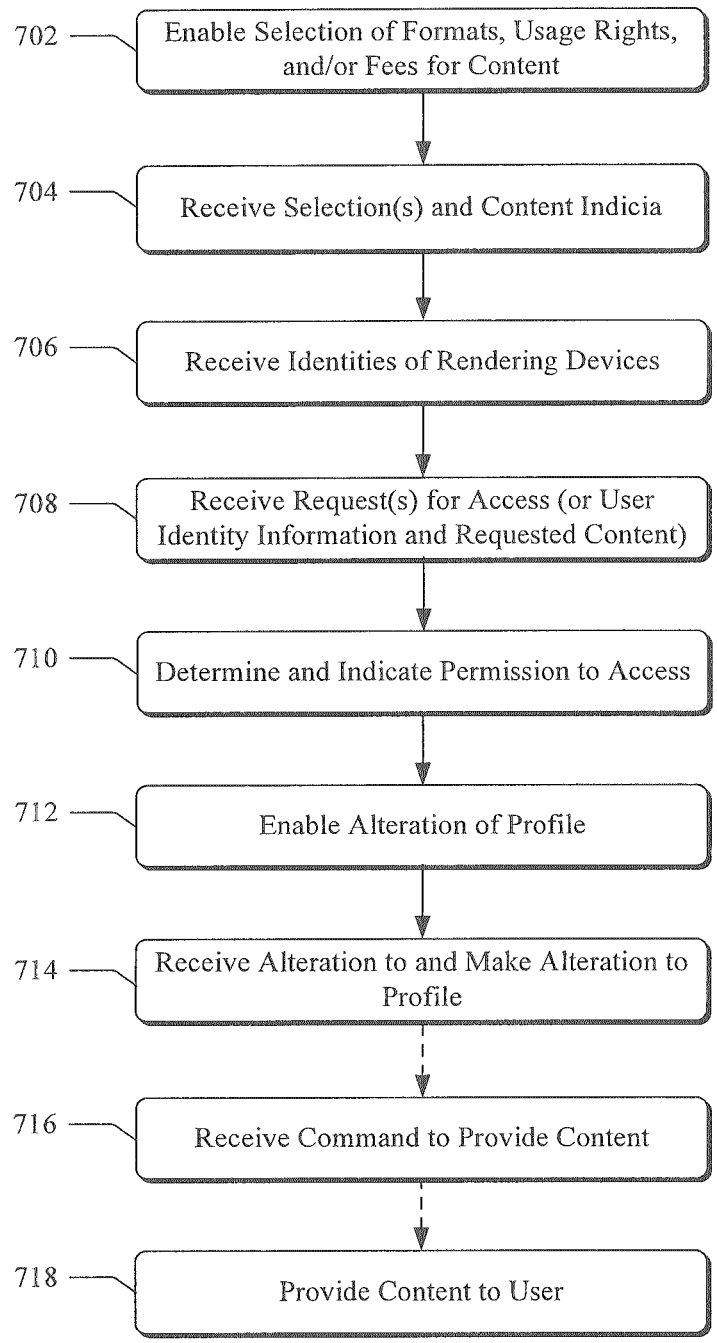
FIG. 7 is an example process illustrating some ways in which the tools may act and interact with devices, third-party content providers, and users effective to manage users' access to entertainment content directly and also indirectly through third-party content providers.
Figure 8:
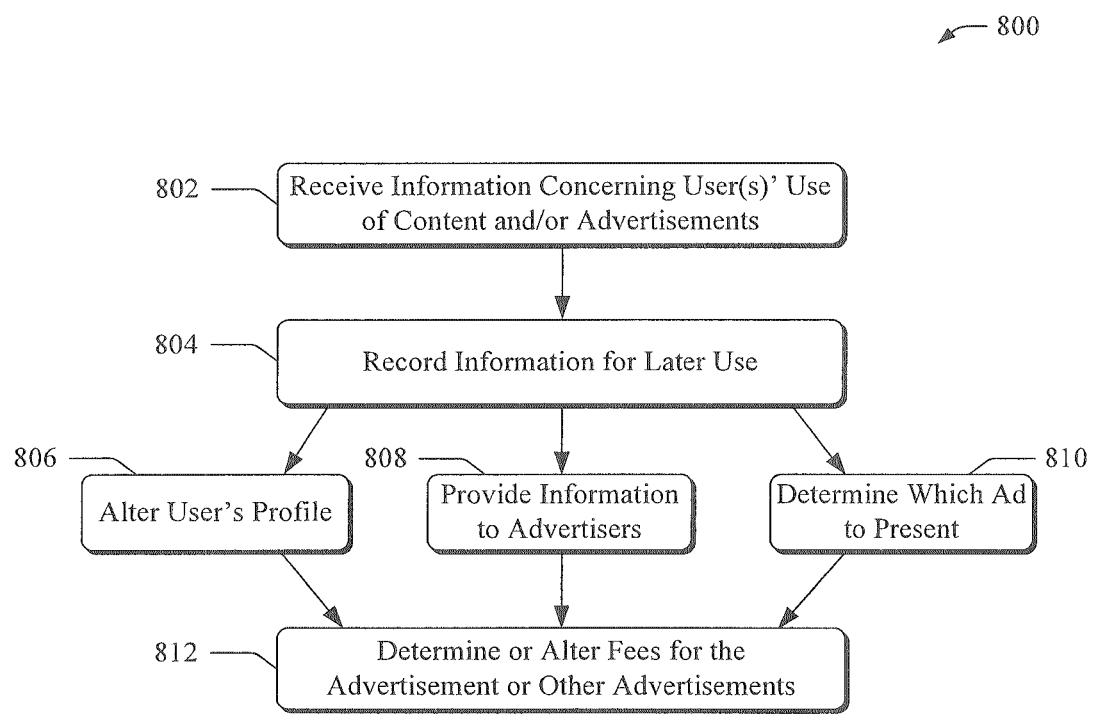
FIG. 8 is an example process illustrating some ways in which the tools may receive and use information concerning users and advertisements.

These example embodiments are described as part of processes 600, 700, and 800 of FIGS. 6, 7, and 8, respectively. These processes and the example processes and flow diagrams described or illustrated in FIGS. 1 through 5 may be implemented in any suitable hardware, software, firmware, or combination thereof; in the case of software and firmware, these processes and flow diagrams represent sets of operations implemented as computer-executable instructions stored in computer-readable media and executable by one or more processors. These embodiments of the tools described in this section are not intended to limit the scope of the tools or the claims.

Block 602 enables multiple third-party content providers to select from a pre-set group of resolution formats, pre-set file formats, pre-set usage rights, and/or fees and for which content or type of content each selection applies. The tools enable third-party content providers to decide how they want to distribute content and for each type or particular content. As described in an example above, the entertainment access service may permit a third-party content provider to select a medium resolution format for a movie and its rights, as well as a particular fee, and even permit a different fee for the same movie at a different resolution.

Block 604 receives various entertainment content or indicia thereof from third-party content providers and a selection of one or more formats, rights, and/or fees associated with each content or content type. Examples of this are provided in FIG. 3.

Block 606 receives identities of rendering devices capable of interacting with users in prescribed or pre-set ways. These device identities are for devices capable of interacting with the entertainment access service or a third-party content provider to render content according to various usage rules and/or rights. In an example described above in FIG. 2, the tools required device manufacturers to render content in particular ways, track and provide various usage information, render advertisements, and enforce usage rules and/or rights. These identities may also include unique identities for each particular device, thereby helping enable the tools to associated particular devices uniquely with particular users.

Block 608 enables users to request or otherwise interact with the tools sufficient to request access to entertainment content. The tools may do so through user interfaces made consistent through relationships with various devices, or even (in a federated manner) through relationships with third-party content providers that provide consistent options, if not consistent user interfaces, for selecting contents and the like.

Block 610 receives a request to access one of more of the entertainment content noted above. The request may be received from a device associated with the user and across a communications network or otherwise. As noted above, if a profile for the user has the device uniquely associated with the user and the device has a unique identifier, the tools may use this information to determine from which user the request is made. In either case the tools receive information in the request or incident with the request sufficient to determine from which user the request was made.

Block 612 determines that the request is from a particular user having an associated profile. Example profiles are described in greater detail above. For the purposes of this process, the tools use a profile that is uniquely associated with a user (whether that user is a single person or a group) and records content to which the user has some right. The profile may contain much more, as the above examples indicate.

The tools may determine that the request is from a user based on the user entering a unique identifier (e.g., account number and password) or based on information received passively in the request related to information in the profile, such as with a unique identifier for the device from which the request is received being associated with the user in the profile.

Responsive to this determination, the tools at block 614 determine whether or not the user has a right to the requested access to the particular content. The tools may do so based on the user having previously paid for a subscription to a third-party content provider's content (from which the requested content is requested), or in other manners described above, such as based on a particular usage right being set forth in the profile and associated with the requested content.

In some cases, optionally at block 616, the tools may determine a format in which to provide or indicate to a third party to provide the content, assuming the request is to download content. The tools may do so based on information associated with a device intended to render the content or based on preferences, etc., both of which may be included in the user's profile. Thus, the tools may provide the content in a resolution format appropriate to a cell phone's small display and in a file format usable by that cell phone, for example.

At block 618 the tools permit the access requested if the user has a right to such access. If the request is received directly from the user and the tools have control of the content, the tools may download the content or otherwise indicate to the device intended to render the content permission to do so. If the request is indirect, as may be in the federated manner of operation for the entertainment access service described above, the tools may instead indicate to an intermediary permission to permit the access. One example of this is when the user makes a request through a third-party content provider, which in turn passes the request and identifying information for the user to the tools, at which time the tools determine if the access is permitted and indicate this to the third-party content provider. The third-party content provider may then permit the access.

Process 700 of FIG. 7 provides another example embodiment of the tools related to a request for access being received from a third-party content provider.

Block 702 enables a third-party content provider to indicate entertainment content and select one or more of pre-set numbers of resolution formats, file formats, and/or usage rights to associate with the indicated entertainment content. Examples of this, including as set forth in process 600, are described above.

Block 704 receives, from the third-party content provider, an indication of the indicated entertainment content and, for the indicated entertainment content, one or more selected resolution formats, one or more selected file formats, and/or one or more selected usage rights. Again, examples of this are described above.

Block 706 receives identities of rendering devices similar to as described at block 606 and the accompanying examples.

Block 708 receives, from the third-party content provider, information indicating a user's identity, and selection of the indicated entertainment content. If the third-party content provider selected more than one resolution format at block 704, block 708 may also receive from the third-party content provider an indication of which of the selected resolution formats is desired by the user or appropriate for the device intended to render the content. Likewise, if the third-party content provider selected more than one file format or usage right for the requested content at block 704, the tools at block 708 may receive an indication of which format or right.

Block 710 determines, based on a usage right associated with the user through the user's identity, that the user has the usage right needed to permit the access requested. The tools may do so by determining the user's identity, the user's profile, and the usage right associated with the requested content. Also at block 710, the tools may indicate this determination (e.g., that the user's requested access is permitted), including to the third-party content provider that sent the request or to a device intended to render the content. Other examples of these determinations are provided above. Responsive to this indication the third-party content provider may provide access to the content, or the device may permit the access (e.g., render a song already stored on the device once the entertainment access service indicates that the user's subscription is up-to-date).

Block 712 enables alteration of a profile uniquely associated with the user. As noted in various examples above, the tools (e.g., the entertainment access service), especially when operating in a federated manner, permit third-party content providers to access and alter a user's profile managed by the entertainment access service, this is shown received and performed in block 714. In so doing the entertainment access service manages a user's profile, rights, and the like, though it may also permit third-party content providers to interact with that profile.

Optionally, block 716 may receive a command from a third-party content provider to provide access to content. Third-party content providers may provide access on their own based on permitted usage rights indicated by the entertainment access service and based on the profile. In some cases, however, the third-party content providers do not provide access and instead delegate this to the entertainment access service. In such cases the entertainment access service at block 716 may receive a command and at block 718 provide the access commanded and act in any of the above ways (e.g., as illustrated in FIGS. 5 and 6) to provide access to users.

The above process 700 and any examples relating to this process above may be performed for many different third-party content providers. Thus, one third-party content provider may provide content to a user and another provide different content to the same user. Both may interact with and even have the ability (provided by the entertainment access service) to alter that user's profile. Thus, one profile for one user may be used to integrate the user's experience, preference, history, and the like regardless of the number of third-party content providers that the user receives content from.

Processes 600 and 700 may act jointly as well. The tools may thereby permit third-party content providers to select content, rights, formats, and the like and users may expressly select (e.g., via preferences in their profiles) which content, rights, formats, and the like that they want.

Process 800 of FIG. 8 provides another example embodiment of the tools related to advertisements. Process 800 works alone or in conjunction with many of the processes and examples set forth above.

Block 802 receives information about one or more users' preferences, such as a user's explicit preferences (e.g., bookmarks and favorites 414A and 414B of FIG. 4) and usage history, including concerning one or more advertisements.

This usage history may include information about what content a user has rights to, how often and when he or she uses that content, demographics (implied or explicit) about the user (e.g., content usage history 414C-I). This usage history may also include advertisement usage history (e.g., 414C-2), which may include how a user interacts with advertisement, such as going to a website presented in the advertisement. The usage history may also comprise an interaction between a user and a particular advertisement. Many devices capable of rendering entertainment content are also capable of enabling users to interact with advertisements and track how a user acts in other ways useful to determining a user's behavior or likely reaction to other advertisements; the tools may track this information, even for many users.

Block 802 may receive this information directly from users, directly from devices rendering advertisements or content, or indirectly, such as from third-party content providers collecting this information and providing it to the tools. The entertainment access service, for example, may receive this information from every device associated with a user (see, for example, devices 106A-E of FIG. 1).

Block 804 records this information for later use. The tools may alter a profile based on this received information, shown at block 806. Alternatively, the tools at block 808 may provide this information to advertisers to indicate how often their advertisement has been seen, when, by what age or other demographic of people, or other positive or negative interactions with the advertisement (like selecting to watch the advertisement again or commanding the device to stop rendering the advertisement).

Also, the tools, at block 810, may use the information to decide between advertisements to present to the user or other users. The tools may determine, for example, that based on the demographic profiles (or entire profiles like profile 400 of FIG. 4) of users that responded well or poorly to a particular advertisement, that the advertisement would or would not be effective for another user or group of users based on those user's demographic profiles.

If the entertainment access service, for example, is attempting to determine what advertisement of a group of advertisements to present to this user or whether to present an advertisement presented to this user to another user, the entertainment access service may do so using this information and information like it from other users. Other examples of how the entertainment access service may use and build this information are set forth above.

Further, the tools at block 812 may use this information to determine or alter payments, fees, and pricing structures on its own or in combination with other user's interactions with and information concerning particular advertisements or groups of advertisements. If users often select a website indicated in an advertisement (or make purchases at that website) the tools may increase a fee charged a third-party advertiser associated with the particular advertisement.

CONCLUSION

The above-described tools can help users enjoy and access their entertainment content. The tools can also help third-party content providers sell access to and control their content, as well as help advertisers target their advertisements to users that are likely to respond favorably. Although the tools have been described in language specific to structural features and/or methodological acts, it is to be understood that the tools defined in the appended claims are not necessarily limited to the specific features or acts described. Rather, the specific features and acts are disclosed as example forms of implementing the tools.

The invention claimed is:

1. An article of manufacture, comprising:
storage hardware having computer-readable instructions therein that, when executed by a computing device, cause the computing device to:
receive, at an entertainment access service, information from a third party content provider indicating an available resolution of content of the third party content provider and at least one of a first fee of the content for the available resolution or a second fee of the content for one or more other resolutions that differs from the first fee;
select one or more other available resolutions for the content that differ from the available resolution indicated by the third party content provider;
output the one or more other available resolutions;
assign the first fee to the content for the available resolution;
assign the second fee to the content for at least one of the one or more other available resolutions;
receive a unique identifier associated with an entertainment access service account of a user of a user device;
receive, at the entertainment access service, a request for the user device to access the content;
determine that the request to access the content is for the user device based upon the unique identifier;
determine a resolution rendering capability of the user device;
determine a resolution at which to send the content to the user device according to the information indicating the available resolution and the resolution rendering capability of the user device;
communicate permission for the user device to access the content; and
send the content to the user device at the resolution determined at which to send the content to the user device.

2. The article of claim 1, wherein the computer-readable instructions are further executable by the computing device to:
receive the content from the third party content provider at the available resolution.

3. The article of claim 1, wherein the resolution of the content sent to the user device includes one of the one or more other available resolutions.

4. The article of claim 1, wherein the computer-readable instructions are further executable by the computing device to:

receive an indication of a selected resolution from a set that includes the available resolution and the one or more other available resolutions;
determine the resolution at which to send the content to the user device further according to the selected resolution; and
output the resolution determined at which to send the content to the user device.

5. The article of claim 4, wherein the indication of the selected resolution is received from the user device over a communications network.

6. The article of claim 1, wherein the information received from the third party content provider further indicates one or more file formats and/or usage rights for the content.

7. The article of claim 1, wherein the storage hardware further has a profile therein; and
wherein the resolution rendering capability of the user device is determined based on device information contained within the profile.

8. A method performed by a computing device hosting an entertainment access service, the method comprising:
receiving information from a third party content provider indicating an available resolution of content of the third party content provider and at least one of a first fee of the content for the available resolution or a second fee of the content for one or more other resolutions that differs from the first fee;
selecting one or more other available resolutions for the content that differ from the available resolution indicated by the third party content provider;
outputting the one or more other available resolutions;
assigning the first fee to the content for the available resolution;
assigning the second fee to the content for at least one of the one or more other available resolutions;
receiving a unique identifier associated with an entertainment access service account of a user of a user device;
receiving a request for the user device to access the content;
determining that the request to access the content is for the user device based upon the unique identifier;
determining a resolution rendering capability of the user device;
determining a resolution at which to send the content to the user device according to the information indicating the available resolution and the resolution rendering capability of the user device;
communicating permission for the user device to access the content; and
sending the content to the user device at the resolution determined at which to send the content to the user device.

9. The method of claim 8, further comprising:
receiving the content from the third party content provider at the available resolution.

10. The method of claim 8, wherein the resolution of the content sent to the user device includes one of the one or more other available resolutions.

11. The method of claim 8, further comprising:
receiving an indication of a selected resolution from a set that includes the available resolution and the one or more other available resolutions; and
determining the resolution at which to send the content to the user device further according to the selected resolution.

12. The method of claim 11, wherein the indication of the selected resolution is received over a communications network.

13. The method of claim 8, wherein the resolution rendering capability of the user device is determined based on device information contained within a profile of the entertainment access service.

14. A method performed by a computing device hosting an entertainment access service, the method comprising:
- receiving content from a third party content provider with information indicating an available resolution of the content and at least one of a first fee of the content for the available resolution or a second fee of the content for one or more other resolutions that differs from the first fee;
- selecting one or more other available resolutions for the content that differ from the available resolution indicated by the third party content provider;
- outputting the one or more other available resolutions;
- assigning the first fee to the content for the available resolution;
- assigning the second fee to the content for at least one of the one or more other available resolutions;
- receiving a unique identifier associated with an entertainment access service account of a user of a user device;
- receiving a request, over a communications network, for the user device to access the content;
- determining that the request to access the content is for the user device based upon the unique identifier;
- determining a resolution rendering capability of the user device;
- determining a resolution at which to send the content to the user device according to the information indicating the available resolution and the resolution rendering capability of the user device; and
- sending the content to the user device at the resolution determined at which to send the content to the user device over a communications network.

15. The method of claim 14, wherein the resolution of the content sent to the user device includes one of the one or more other available resolutions.

* * * * *